United States Patent
Ichioka

(10) Patent No.: US 10,303,204 B2
(45) Date of Patent: May 28, 2019

(54) CLOCK DIAGNOSTIC APPARATUS, CLOCK DIAGNOSTIC METHOD, AND COMPUTER READABLE MEDIUM

(71) Applicant: Mitsubishi Electric Corporation, Chiyoda-ku (JP)

(72) Inventor: Ryoya Ichioka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/573,164

(22) PCT Filed: May 27, 2015

(86) PCT No.: PCT/JP2015/065228
§ 371 (c)(1),
(2) Date: Nov. 10, 2017

(87) PCT Pub. No.: WO2016/189688
PCT Pub. Date: Dec. 1, 2016

(65) Prior Publication Data
US 2018/0129244 A1   May 10, 2018

(51) Int. Cl.
*G06F 11/273* (2006.01)
*G06F 1/14* (2006.01)
(Continued)

(52) U.S. Cl.
CPC .............. *G06F 1/14* (2013.01); *G06F 1/04* (2013.01); *G06F 11/24* (2013.01); *G06F 11/273* (2013.01)

(58) Field of Classification Search
CPC . G06F 11/273; G06F 1/14; G06F 1/04; G06F 11/263
See application file for complete search history.

(56) References Cited

U.S. PATENT DOCUMENTS 6,023,771 A * 2/2000 Watanabe ................. G06F 1/04
                                                      713/501
7,350,116 B1 * 3/2008 Parrish ................. H04J 3/0688
                                                      713/600
(Continued)

FOREIGN PATENT DOCUMENTS

CN        101779376 A        7/2010
CN        102073008 A        5/2011
(Continued)

OTHER PUBLICATIONS

Decision to Grant a Patent dated Sep. 12, 2017 in Japanese Patent Application No. 2017-520153 (with English-language Translation).
(Continued)

*Primary Examiner* — Yolanda L Wilson
(74) *Attorney, Agent, or Firm* — Oblon, McClelland, Maier & Neustadt, L.L.P.

(57) ABSTRACT

A clock diagnostic apparatus repeatedly acquires clock values at constant intervals by software. A clock diagnostic unit (103) selects, from among the clock values which are acquired by the software, two clock values having a gap between acquisition timings, the gap being a predetermined time period which is sufficiently large compared to jitter which occurs at a time of acquiring a clock value by the software. The clock diagnostic unit (103) calculates a difference between the two clock values selected.

6 Claims, 3 Drawing Sheets

(51) Int. Cl.
  *G06F 1/04* (2006.01)
  *G06F 11/24* (2006.01)

(56) References Cited

U.S. PATENT DOCUMENTS

| | | | | |
|---|---|---|---|---|
| 8,717,066 | B2* | 5/2014 | Ohnishi | G06F 1/04 327/20 |
| 2001/0033339 | A1* | 10/2001 | Urushiyama | G01R 29/26 348/497 |
| 2009/0039867 | A1* | 2/2009 | Saint-Laurent | G04F 10/005 324/102 |
| 2010/0308868 | A1* | 12/2010 | Zinke | G06F 11/1604 327/20 |
| 2012/0229180 | A1* | 9/2012 | Zhou | G06F 1/04 327/115 |
| 2013/0282318 | A1 | 10/2013 | Chen et al. | |

FOREIGN PATENT DOCUMENTS

| | | |
|---|---|---|
| CN | 102403043 A | 4/2012 |
| CN | 102857223 A | 1/2013 |
| JP | 03-100815 A | 4/1991 |
| JP | 11-031022 A | 2/1999 |
| JP | 2005-284426 | 10/2005 |
| JP | 2007-316815 A | 12/2007 |
| JP | 2013-156732 A | 8/2013 |
| JP | 2015-061315 A | 3/2015 |
| TW | 540242 B | 7/2003 |
| TW | 201344392 A | 11/2013 |

OTHER PUBLICATIONS

Office Action dated Aug. 12, 2016 in Taiwanese Application No. 104122259 (with partial English translation).
International Search Report dated Jul. 7, 2015 in PCT/JP2015/065223, filed on May 27, 2015.
Combined Office Action and Search Report dated Aug. 14, 2018 in Chinese Patent Application No. 201580080419.5, (with English translation of Office Action and English translation of categories of cited documents), 18 pages.
Chinese Office Action dated Jan. 9. 2019 in Chinese Patent Application No. 201580080419.5 (with unedited computer generated English translation), 11 pages.

* cited by examiner

CLOCK DIAGNOSTIC APPARATUS, CLOCK DIAGNOSTIC METHOD, AND COMPUTER READABLE MEDIUM

TECHNICAL FIELD

The present invention relates to a clock failure diagnosis.

BACKGROUND ART

With regard to the clock failure diagnosis, there is a technology disclosed in Patent Literature 1, for example.

In Patent Literature 1, the clock failure diagnosis is performed by analyzing clock values of two clocks.

CITATION LIST

Patent Literature

Patent Literature 1: JP 2013-156732 A

SUMMARY OF INVENTION

Technical Problem

In the clock failure diagnosis, there is a method of acquiring the clock value by software.

In a case where the clock value is acquired by the software, jitter (fluctuation) occurs as for a time period (hereinafter referred to as a clock value acquisition processing time period) required for acquiring the clock value.

For example, when an interrupt to the software occurs, the clock value acquisition processing time period becomes longer due to a delay caused by the interrupt.

In general, accuracy required for the clock failure diagnosis is several hundred ppm (ppm: $10^{-6}$).

This means that it is necessary to detect "whether a deviation of 0.1 milliseconds exits in 1 second or not".

In acquiring the clock value by the software, fluctuation in the order of microseconds or milliseconds may occur in the clock value acquisition processing time period.

As described above, in the method of acquiring the clock value by the software, the jitter greatly influences the accuracy of the clock failure diagnosis, and in order to accurately detect the failure of the clock, it is necessary to suppress the influence of the jitter.

The present invention has been made in view of such circumstances. The present invention mainly aims to suppress an influence of jitter which occurs at a time of acquiring a clock value in a clock failure diagnosis in which the clock value is acquired by software.

Solution to Problem

A clock diagnostic apparatus repeatedly acquiring clock values at constant intervals by software, the clock diagnostic apparatus includes:

a selection unit to select, from among the clock values which are acquired by the software, two clock values having a gap between acquisition timings, the gap being a predetermined time period which is sufficiently large compared to jitter which occurs at a time of acquiring a clock value by the software; and a calculation unit to calculate a difference between the two clock values selected by the selection unit.

Advantageous Effects of Invention

According to the present invention, since two clock values are used, which are spaced apart from each other with a predetermined time period which is sufficiently large compared to jitter, it is possible to suppress an influence of the jitter in a clock failure diagnosis.

DESCRIPTION OF EMBODIMENTS

Embodiment 1

*Overview of Failure Diagnosis*

In the present embodiment, a clock diagnostic apparatus will be described, which is capable of accurately detecting clock failure even when jitter occurs at a time of acquiring a clock value by software.

In the clock diagnostic apparatus according to the present embodiment, a time period which is sufficiently large compared to the jitter which occurs at the time of acquiring the clock value is set as a predetermined time period.

Then, the clock diagnostic apparatus repeatedly acquires clock values of two clocks at predetermined cycles by the software.

Further, the clock diagnostic apparatus selects, from among the clock values which are acquired by the software, two clock values having a gap between acquisition timings, the gap being the predetermined time period.

Furthermore, the clock diagnostic apparatus calculates a difference between the two clock values selected, for each clock, compares the difference between the clock values of each clock to one another, and performs a clock failure diagnosis.

The clock diagnostic apparatus determines that one of the two clocks has failed when the differences in clock values are different between the two clocks.

For example, when the jitter of a clock value acquisition processing time period is 1 microsecond on average, if the difference between the clock values is calculated at 10 millisecond intervals, an influence of 1 microsecond jitter is large and accuracy of several hundreds of ppm cannot be satisfied.

On the other hand, if the difference between the clock values is calculated at 1 second intervals, the influence of 1 microsecond jitter is absorbed and the accuracy of several hundreds of ppm can be satisfied.

As described above, in the present embodiment, an interval which is sufficiently large compared to the jitter which occurs at the time of acquiring the clock value is set as the predetermined time period, and the two clock values having the gap between the acquisition timings by the software, the gap being the predetermined time period, is used for the clock failure diagnosis.

The predetermined time period is, for example, a time period which is 100 times or more of the jitter.

Figure 1:
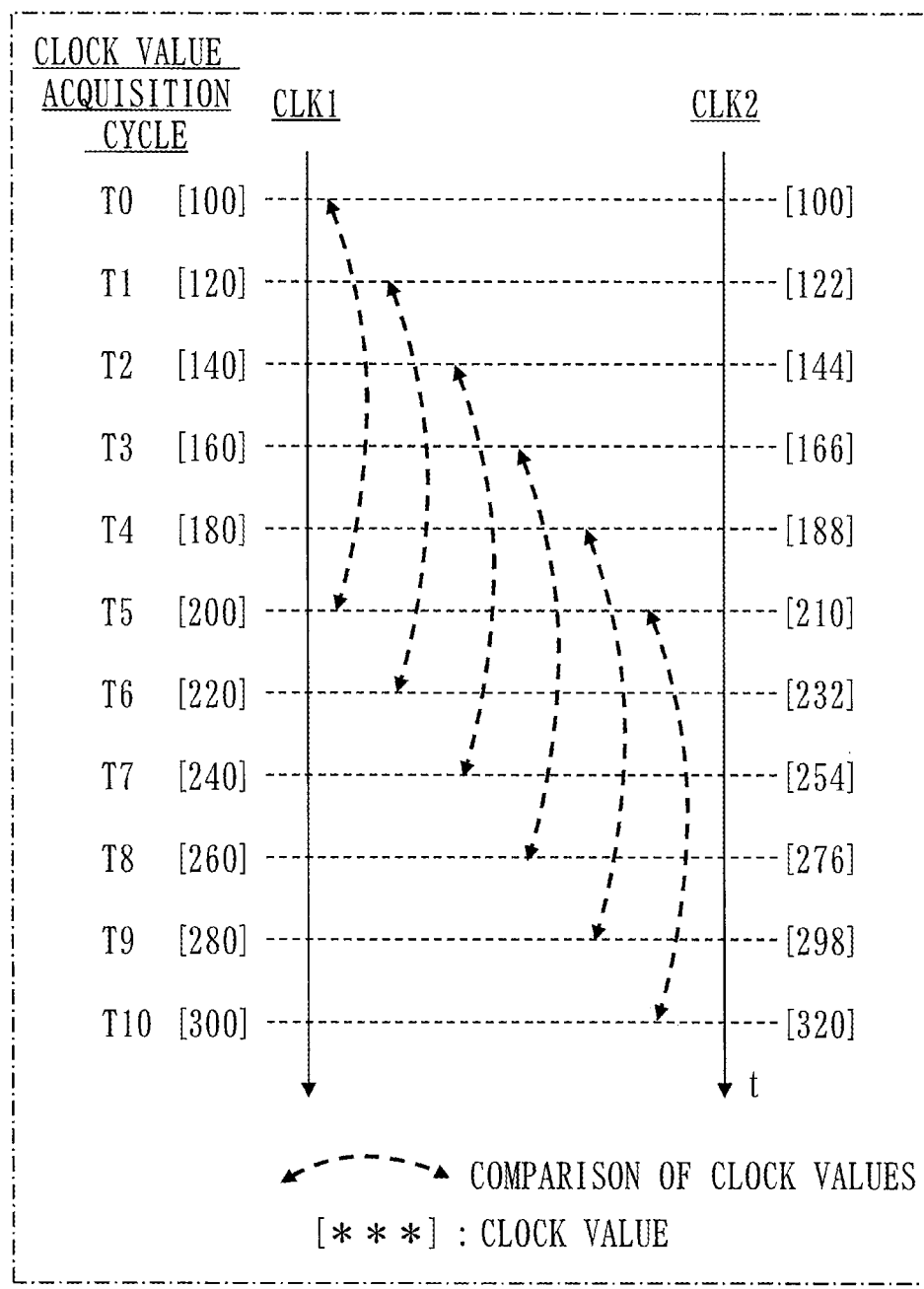
FIG. 1 is a diagram illustrating a comparative example of clock values according to a first embodiment.

FIG. 1 illustrates an overview of an operation of the clock diagnostic apparatus according to the present embodiment.

FIG. 1 illustrates the operation in which the clock diagnostic apparatus selects two clock values having a gap between acquisition timings, the gap being the predetermined time period, from among clock values periodically obtained from a clock 1 (denoted as CLK1) and a clock 2 (denoted as CLK2) and calculates a difference between the two clock values selected.

A clock value acquisition cycle is a cycle for acquiring the clock values from the CLK1 and the CLK2.

In FIG. 1, the clock values are acquired from the CLK1 and the CLK2 eleven times from T0 to T10.

In a clock value acquisition cycle T0, the clock value acquired from the CLK1 is 100, and the clock value acquired from the CLK2 is 100.

In a clock value acquisition cycle T1, the clock value acquired from the CLK1 is 120, and the clock value acquired from the CLK2 is 122.

In a clock value acquisition cycle T2, the clock value acquired from the CLK1 is 140, and the clock value acquired from the CLK2 is 144.

In subsequent clock value acquisition cycles as well, the clock values of the CLK1 and the clock values of the CLK2 acquired at respective clock value acquisition cycles are illustrated.

In an example of FIG. 1, the predetermined time period is set to be a time period equivalent to five clock value acquisition cycles.

The clock diagnostic apparatus according to the present embodiment selects the two clock values whose acquisition timings by the software are spaced apart from each other with five cycles.

Specifically, the clock diagnostic apparatus selects the clock value [100] of the CLK1 acquired at the clock value acquisition cycle=T0 and the clock value [200] of the CLK1 acquired at a clock value acquisition cycle=T5.

Then, the clock diagnostic apparatus selects the clock value [100] of the CLK2 acquired at the clock value acquisition cycle=T0 and the clock value [210] of the CLK2 acquired at the clock value acquisition cycle=T5.

Further, the clock diagnostic apparatus calculates the difference between the clock value [100] and the clock value [200] for the CLK1 and the difference between the clock value [100] and the clock value [210] for the CLK2.

Furthermore, the clock diagnostic apparatus compares the difference in the clock values of the CLK1: 100 with the difference between the clock values of the CLK2: 110.

If the difference of the CLK1 and the difference of the CLK2 are not equal, the clock diagnostic apparatus determines either of the CLK1 and the CLK2 has failed.

In subsequent cycles, the clock diagnostic apparatus selects the clock values which are spaced apart with five cycles, such as T1 and T6, T2 and T7, and T3 and T8, and performs the same calculation.

In the example of FIG. 1, the CLK1 and the CLK2 are synchronized at a time when the respective clock values are 100 (T=0), but the clock value of the CLK2 advances faster afterwards.

*Explanation of Configuration*

Figure 2:
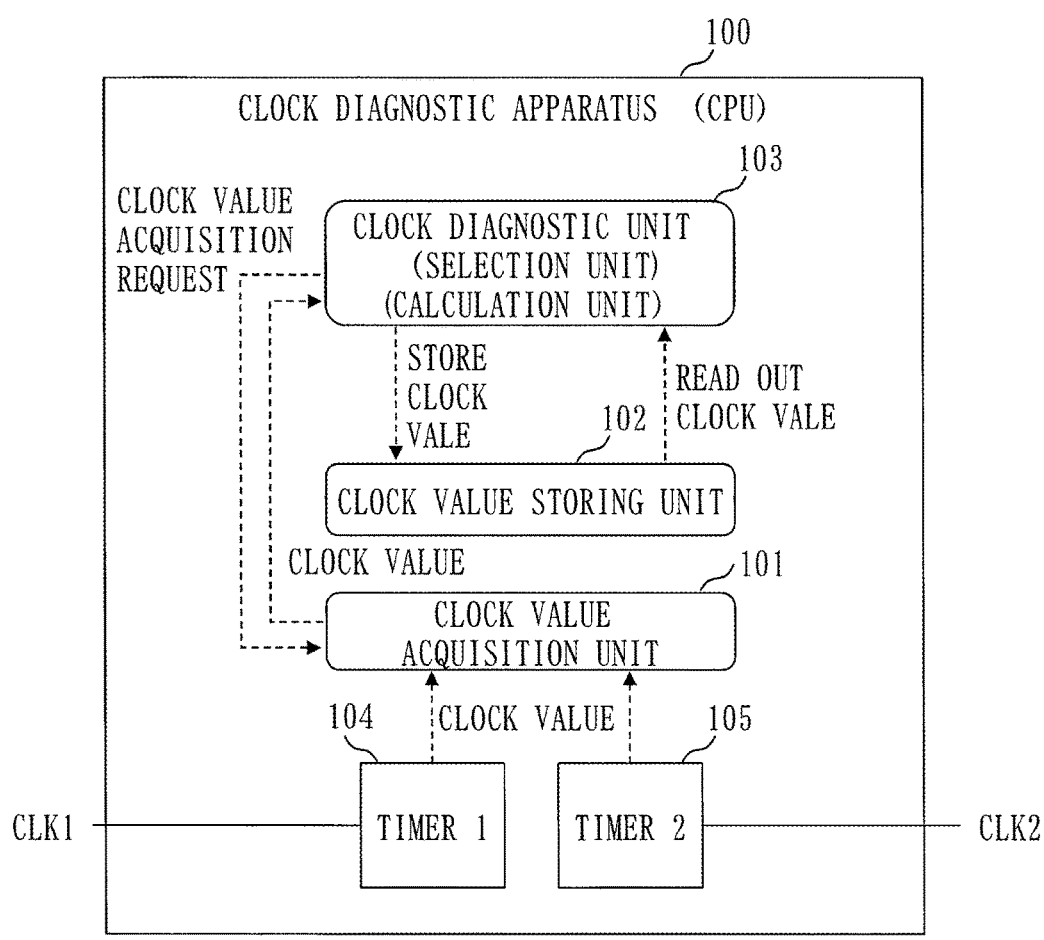
FIG. 2 is a diagram illustrating a configuration example of a clock diagnostic apparatus according to the first embodiment.

FIG. 2 illustrates a configuration example of a clock diagnostic apparatus 100 according to the present embodiment.

The clock diagnostic apparatus 100 is implemented by a processor such as a CPU (Central Processing Unit), for example.

The clock value acquisition unit 101 is software which acquires the clock value of the CLK1 using a timer 1 (104) and acquires the clock value of the CLK2 using a timer 2 (105), for each clock value acquisition cycle, based on a clock value acquisition request from a clock diagnostic unit 103 to be described later.

Each of the timer 1 (104) and the timer 2 (105) measures the clock value acquisition cycle.

As described above, in a clock value acquisition processing time period by the clock value acquisition unit 101, the jitter occurs due to an interruption or the like.

The clock value acquisition unit 101 outputs the obtained clock values of the CLK1 and the CLK2 to the clock diagnostic unit 103.

A clock value storing unit 102 stores the clock values of the CLK1 and the CLK2 acquired by the clock value acquisition unit 101.

More specifically, the clock values of the CLK1 and the CLK2 output from the clock value acquisition unit 101 to the clock diagnostic unit 103 is written into the clock value storing unit 102 by the clock diagnostic unit 103.

Additionally, the clock value storing unit 102 outputs the stored clock values of the CLK1 and the CLK2 to the clock diagnostic unit 103 based on a clock value readout request from the clock diagnostic unit 103.

The clock diagnostic unit 103 outputs the clock value acquisition request to the clock value acquisition unit 101 and makes the clock value acquisition unit 101 acquire the clock values of the CLK1 and the CLK2 for each clock value acquisition cycle.

When newly acquiring the clock values of the CLK1 and the CLK2 from the clock value acquisition unit 101, the clock diagnostic unit 103 reads out from the clock value storing unit 102, the clock values of the CLK1 and the CLK2 which have been acquired in a cycle which is traced back by the predetermined time period from a cycle in which new clock values of the CLK1 and the CLK2 are acquired by the clock value acquisition unit 101.

In a case where the predetermined time period is set to five cycles as in the example of FIG. 1, the clock diagnostic unit 103 reads out the clock value of the CLK1 and the clock value of the CLK2 acquired by the clock value acquisition unit 101 five cycles ago.

For example, if a current cycle is T=5, the clock diagnostic unit 103 reads out the clock values of the CLK1 and the CLK2 at T=0.

Then, the clock diagnostic unit 103 calculates the difference between the new clock value of the CLK1 and the clock value of the CLK1 read out from the clock value storing unit 102 and also calculates the difference between the new clock value of the CLK2 and the clock value of the CLK2 read out from the clock value storing unit 102.

Further, the clock diagnostic unit 103 compares the difference between the clock values of the CLK1 with the difference between the clock values of the CLK2.

If the difference between the clock values of the CLK1 and the difference between the clock values of the CLK2 is different, the clock diagnostic unit 103 determines that a failure has occurred at either the CLK1 or the CLK2.

The clock diagnostic unit 103 corresponds to an example of a selection unit and a calculation unit.

As described above, the clock value acquisition unit 101 is realized by the software (program).

The clock diagnostic unit 103 is also realized by the software (program).

The clock value storing unit 102 is realized by, for example, a register in the CPU.

A program realizing the functions of the clock value acquisition unit 101 and the clock diagnostic unit 103 is stored in a memory not illustrated in FIG. 2. The CPU loads the program realizing the functions of the clock value acquisition unit 101 and the clock diagnostic unit 103 from the memory and executes the program, and thereby processing of the clock value acquisition unit 101 and the clock diagnostic unit 103 described above is performed.

*Explanation of Operation*

Next, an operation example of the clock diagnostic apparatus 100 according to the present embodiment will be described with reference to a flowchart of FIG. 3.

Figure 3:
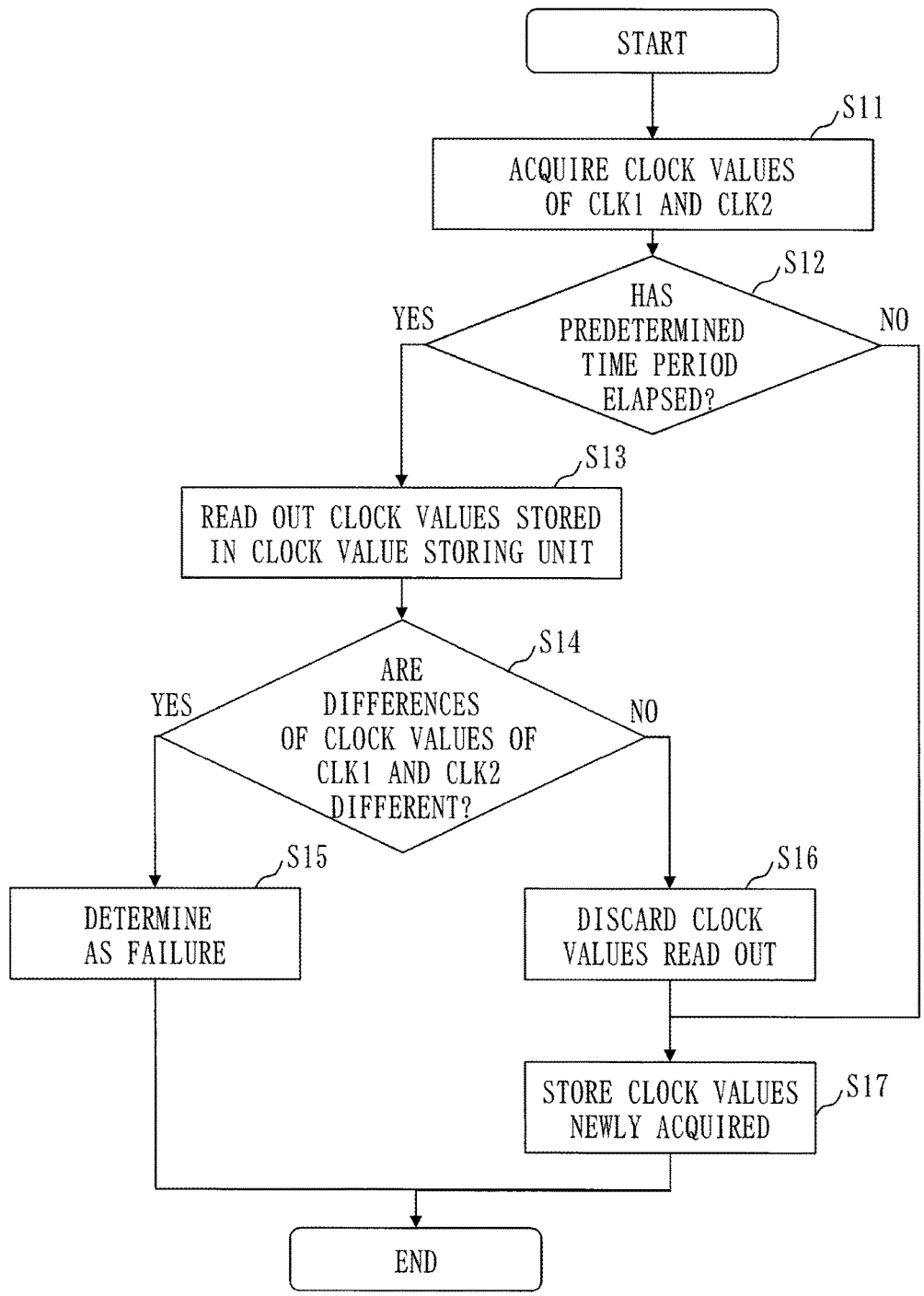
FIG. 3 is a flowchart diagram illustrating an operation example of the clock diagnostic apparatus according to the first embodiment

A procedure illustrated in the flowchart of FIG. 3 corresponds to an example of a clock diagnostic method.

First, the clock diagnostic unit 103 outputs the clock value acquisition request to the clock value acquisition unit 101 in a cycle Tn, and causes the clock value acquisition unit 101 to acquire the clock values of the CLK1 and the CLK2 at constant cycles.

Further, the clock diagnostic unit 103 acquires the clock values of the CLK1 and the CLK2 from the clock value acquisition unit 101 (S11).

Next, the clock diagnostic unit 103 determines whether or not the predetermined time period has elapsed (S12).

In other words, the clock diagnostic unit 103 determines whether or not the clock values which have been acquired in a cycle which is traced back by the predetermined time period from a current cycle (the current cycle is referred to as the cycle Tn) are stored in the clock value storing unit 102.

In a case where the predetermined time period is set to five cycles as in the example of FIG. 1, the clock diagnostic unit 103 determines whether or not the clock values of the cycle T (n−5) which is traced back by five cycles from the current cycle Tn are stored in the clock value storing unit 102.

If it is determined in S12 that the predetermined time period has not elapsed, the clock diagnostic unit 103 stores the clock value newly acquired in S11 in the clock value storing unit 102 (S17).

If it is determined in S12 that the predetermined time period has elapsed, the clock diagnostic unit 103 outputs the clock value readout request, and reads out from the clock value storing unit 102, the clock value acquired in the cycle which is traced back by the predetermined time period from the current cycle (S13).

In a case where the predetermined time period is set to five cycles as in the example of FIG. 1, the clock diagnostic unit 103 reads out the clock value of the CLK1 and the clock value of the CLK2 at the cycle T(n−5).

Next, the clock diagnostic unit 103 determines whether or not the difference between the clock values of the CLK1 and the difference between the clock values of the CLK2 are different (S14).

That is, the clock diagnostic unit 103 calculates the difference between the new clock value acquired in S11 and the clock value read out in S13, for each of the CLK1 and the CLK2.

Then, the clock diagnostic unit 103 determines whether or not the difference between the clock values of the CLK1 and the difference between the clock values of the CLK2 are different.

When the difference between the clock values of the CLK1 and the difference between the clock values of the CLK2 are different, the clock diagnostic unit 103 determines that either of the CLK1 and the CLK2 has failed (S15).

On the other hand, if the difference between the clock values of the CLK1 and the difference between the clock values of the CLK2 are the same, the clock diagnostic unit 103 discards the clock values read out at S13 (S16), and stores the clock values newly acquired in S11 in the clock value storing unit 102 (S17).

As illustrated in FIG. 1, if it is possible to calculate the difference between the two clock values having the gap between the acquisition timings by the clock value acquisition unit 101, the gap being the predetermined time period, a processing flow of the clock diagnostic apparatus 100 may be different from the flowchart of FIG. 3.

As mentioned above, according to the present embodiment, since two clock values are used, which are spaced apart from each other with the predetermined time period which is sufficiently large compared to jitter, it is possible to suppress an influence of the jitter and perform a clock failure diagnosis with high accuracy.

Further, in the present embodiment, since the clock failure diagnosis is realized by the software, it is possible to suppress a circuit scale without requiring hardware exclusive for diagnosis.

Furthermore, in the present embodiment, since the clock diagnosis is performed by utilizing functions provided in a general CPU such as a timer, the clock diagnostic method according to the present embodiment can be applied to various CPUs.

In the above description, an example has been described in which the clock failure is determined by comparing the differences in the clock values of the two clocks (the CLK1 and the CLK2), however, a clock failure may be determined by comparing differences in clock values of three or more clocks.

REFERENCE SIGNS LIST

100: clock diagnostic apparatus, 101: clock value acquisition unit, 102: clock value storing unit, 103: clock diagnostic unit, 104: timer 1, 105: timer 2

The invention claimed is:

1. A clock diagnostic apparatus repeatedly acquiring clock values at constant intervals from at least a first clock and a second clock by software, the clock diagnostic apparatus comprising:
   a processor configured to:
   select, for each of the first clock and the second clock and from among the clock values acquired by the software, two clock values having a gap between acquisition timings, the gap being a predetermined time period which is larger than jitter which occurs at a time of acquiring a clock value by the software;
   calculate a difference between the two clock values selected for each of the first and second clocks to generate a difference for the first clock and a difference for the second clock; and
   determine that at least one of the first clock and the second clock has failed when the difference for the first clock does not equal the difference for the second clock.

2. The clock diagnostic apparatus according to claim 1, wherein
   the processor uses a time period that is 100 times or more of the jitter, as the predetermined time period.

3. The clock diagnostic apparatus according to claim 1, further comprising:
   a clock value storage configured to store the clock values acquired by the software, wherein
   when a clock value is newly acquired by the software, the processor reads out from the clock value storage, a clock value acquired by the software at a timing which is traced back by the predetermined time period from a timing of acquiring the new clock value, and selects the clock value read out from the clock value storage and the new clock value, as the two clock values.

4. The clock diagnostic apparatus according to claim 3, wherein the clock value storage stores at least five clock values, spaced apart by the predetermined time period, for each of the first clock and the second clock.

5. A clock diagnostic method by a clock diagnostic apparatus which repeatedly acquires clock values at constant intervals from at least a first clock and a second clock by software, the clock diagnostic method comprising:
    selecting, for each of the first clock and the second clock and from among the clock values which are acquired by the software, two clock values having a gap between acquisition timings, the gap being a predetermined time period which is larger than jitter which occurs at a time of acquiring a clock value by the software;
    calculating a difference between the two clock values selected for each of the first and second clocks to generate a difference for the first clock and a difference for the second clock; and
    determining that at least one of the first clock and the second clock has failed when the difference for the first clock does not equal the difference for the second clock.

6. A non-transitory computer-readable medium encoded with computer-readable instructions that, when executed by a processor, cause the processor to perform a clock diagnostic method in which clock values are repeatedly acquired at constant intervals from at least a first clock and a second clock, comprising:
    selecting, for each of the first clock and the second clock and from among the clock values which are acquired, two clock values having a gap between acquisition timings, the gap being a predetermined time period which is larger than jitter which occurs at a time of acquiring a clock value;
    calculating a difference between the two clock values selected for each of the first and second clocks to generate a difference for the first clock and a difference for the second clock; and
    determining that at least one of the first clock and the second clock has failed when the difference for the first clock does not equal the difference for the second clock.

\* \* \* \* \*